United States Patent
Ozbaysal et al.

(10) Patent No.: US 8,640,942 B1
(45) Date of Patent: Feb. 4, 2014

(54) REPAIR OF SUPERALLOY COMPONENT

(71) Applicants: Kazim Ozbaysal, Orlando, FL (US);
Ahmed Kamel, Orlando, FL (US);
Dhafer Jouini, Orlando, FL (US)

(72) Inventors: Kazim Ozbaysal, Orlando, FL (US);
Ahmed Kamel, Orlando, FL (US);
Dhafer Jouini, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/799,922

(22) Filed: Mar. 13, 2013

(51) Int. Cl.
*B23K 31/02* (2006.01)
*B23P 6/04* (2006.01)

(52) U.S. Cl.
USPC .......................................... 228/119; 29/889.1

(58) Field of Classification Search
None
See application file for complete search history.

(56) References Cited

U.S. PATENT DOCUMENTS

| | | | | |
|---|---|---|---|---|
| 3,110,588 A | * | 11/1963 | Mobley | 420/446 |
| 4,705,203 A | * | 11/1987 | McComas et al. | 228/119 |
| 5,040,718 A | * | 8/1991 | Lee et al. | 228/119 |
| 5,240,491 A | * | 8/1993 | Budinger et al. | 75/255 |
| 5,395,584 A | * | 3/1995 | Berger et al. | 420/443 |
| 6,027,584 A | * | 2/2000 | Jackson et al. | 148/427 |
| 6,464,128 B1 | * | 10/2002 | Messelling et al. | 228/119 |
| 6,520,401 B1 | * | 2/2003 | Miglietti | 228/194 |
| 7,293,688 B2 | | 11/2007 | Ozbaysal | |
| 7,328,832 B2 | | 2/2008 | Ozbaysal | |
| 7,363,707 B2 | * | 4/2008 | Powers | 29/889.1 |
| 7,377,417 B2 | * | 5/2008 | Kinstler | 228/119 |
| 7,434,720 B2 | | 10/2008 | Ozbaysal | |
| 7,461,772 B2 | | 12/2008 | Ozbaysal | |
| 7,653,996 B2 | * | 2/2010 | Jungbluth et al. | 29/889.1 |
| 7,748,601 B2 | | 7/2010 | Ozbaysal | |
| 7,867,628 B2 | | 1/2011 | Ozbaysal | |
| 8,235,275 B1 | * | 8/2012 | Stankowski et al. | 228/56.3 |
| 2003/0066177 A1 | * | 4/2003 | Schnell et al. | 29/402.18 |
| 2004/0050913 A1 | * | 3/2004 | Philip | 228/194 |
| 2007/0017958 A1 | * | 1/2007 | Hasz et al. | 228/101 |
| 2007/0224445 A1 | * | 9/2007 | Hasegawa et al. | 428/660 |
| 2007/0295785 A1 | * | 12/2007 | Budinger | 228/119 |
| 2008/0290137 A1 | * | 11/2008 | Budinger | 228/119 |
| 2009/0159645 A1 | * | 6/2009 | Cretegny et al. | 228/119 |
| 2010/0038412 A1 | * | 2/2010 | Huang | 228/262.9 |
| 2013/0020377 A1 | * | 1/2013 | Stankowski et al. | 228/119 |
| 2013/0095342 A1 | * | 4/2013 | Schick et al. | 428/600 |
| 2013/0112737 A1 | * | 5/2013 | Clement | 228/119 |

FOREIGN PATENT DOCUMENTS

JP          54-051941 A    *   4/1979

* cited by examiner

*Primary Examiner* — Kiley Stoner

(57) ABSTRACT

A method of repairing a superalloy component (22) wherein a section (24) of the component containing a plurality of service-induced cracks (18, 20) is removed, then a replacement section (26) of superalloy material is installed with a structural braze joint (28) containing no boron or silicon. The replacement section may have a textured surface ((38) to enhance bonding with an overlying thermal barrier coating (42). The replacement section may be pre-formed to standardized dimensions in expectation of a typical service-induced crack pattern, and the removed section excavated accordingly. The interface between the replacement section and the component may be shaped to provide a mechanical interlock there between.

12 Claims, 2 Drawing Sheets

REPAIR OF SUPERALLOY COMPONENT

FIELD OF THE INVENTION

This application relates generally to the field of metals joining, and more particularly in some embodiments to the repair of superalloy gas turbine components with a brazing process.

BACKGROUND OF THE INVENTION

Gas turbine engine hot gas path parts are often manufactured of superalloy materials. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

FIG. 1 illustrates a known gas turbine engine blade 10 including an airfoil 12, platform 14, and root 16. The blade 10 may be manufactured from a superalloy material, and may be covered by any of several known thermal barrier coating systems. Such blades are known to develop service-induced thermal-mechanical fatigue cracks, such as cracks 18, 20 located on the platform 14. Other forms of service-induced degradation of the superalloy material are possible, and such defects may form in other areas of the blade 10 or in other hot gas path components of the engine.

It is known that superalloy materials are among the most difficult materials to repair due to their susceptibility to weld solidification cracking and strain age cracking. Prior art gas turbine superalloy components such as blade 10 which developed service-induced defects in their superalloy base materials often could not be repaired, resulting in a large expense to replace the component. Cracks in superalloy materials can be repaired with brazing processes, but such repairs are of limited application because of the limited strength of the braze material and because the brazing process typically requires the use of a detrimental melting point depressant material, such as boron or silicon. Thus, improved processes for the repair of superalloy materials are desired.

BRIEF DESCRIPTION OF THE DRAWINGS

The invention is explained in view of the following drawings. Like features illustrated in multiple drawings are identified with like numerals.

DETAILED DESCRIPTION OF THE INVENTION

Figure 1:
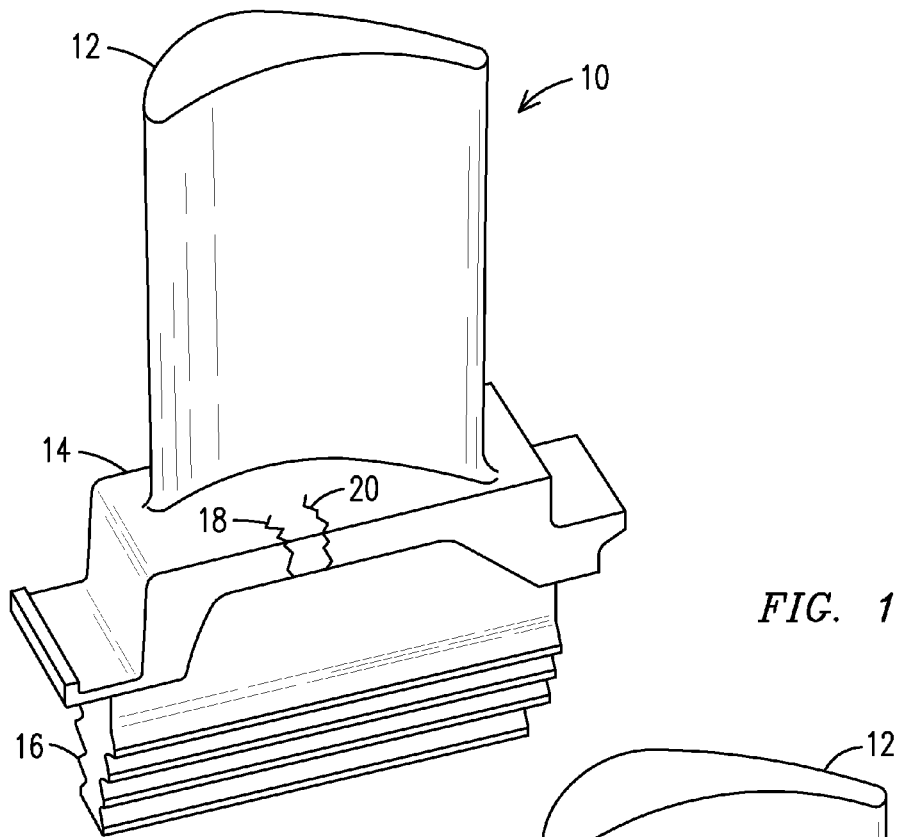
FIG. 1 illustrates a prior art gas turbine blade exhibiting service-induced cracks.
Figure 2:
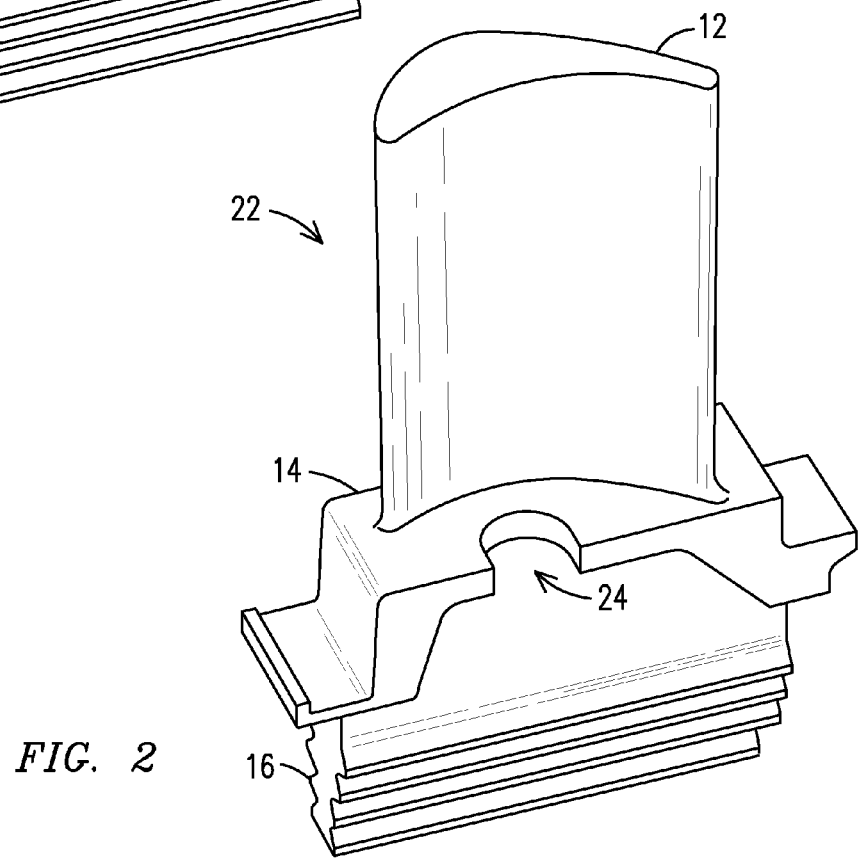
FIG. 2 illustrates a gas turbine blade with a section of its platform removed in order to eliminate service-induced cracks.

FIG. 2 illustrates a gas turbine blade 22 after a section 24 of the platform 14 has been removed, such as by machining, grinding, cutting or other known process. Advantageously, the removed section 24 encompasses the location of previously-present service-induced cracks 18, 20.

Figure 3:
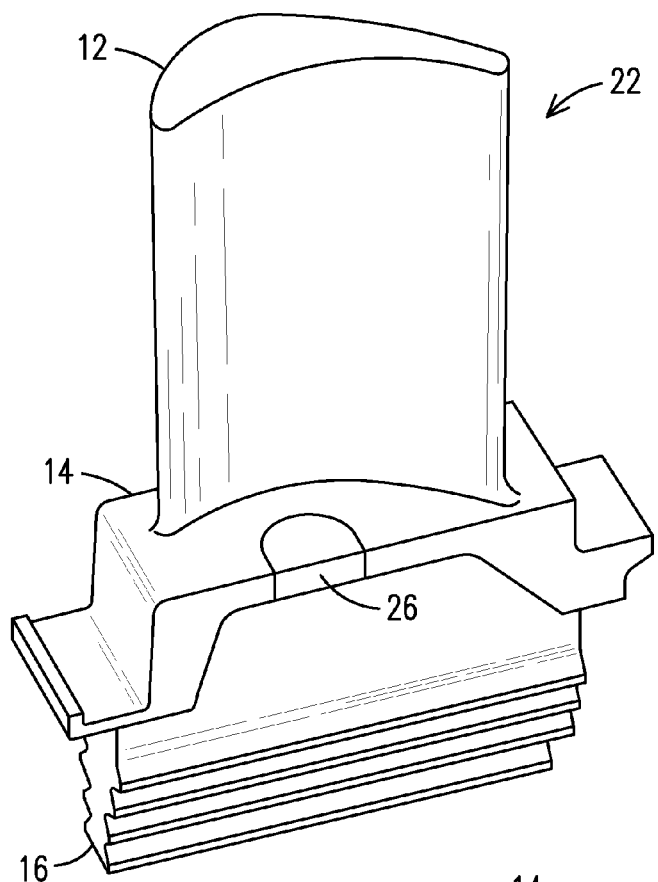
FIG. 3 illustrates the blade of FIG. 2 with a replacement section joined in place of the removed section of the platform.

FIG. 3 illustrates the gas turbine blade 22 of FIG. 2 after a replacement section 26 has been joined to the platform 14 in place of the removed section 24, thus eliminating the need for the cleaning and repair of individual cracks 18, 20. The replacement section 26 is joined by a brazing process. Improved braze materials suitable for use with superalloy materials have been developed by the assignee of the present invention, such as the nickel-chromium-titanium based alloys described in co-pending U.S. patent application Ser. Nos. 13/495,223 and 13/467,402, both of which are incorporated by reference herein. Those materials compare favorably in strength to previous braze materials, and they are strong enough to be considered a structural repair (i.e. at least 70% of the yield strength of the base metal). The present invention takes advantage of such improved braze properties by allowing replacement section 26 to be formed of the same superalloy material as the remaining portions of the blade 22, or to be formed of another superalloy material with specific properties desired for the particular location of the removed section 24. The replacement section 26 may be uncoated or it may be at least partially coated with a thermal barrier coating prior to being brazed into place, but in either case, any thermal barrier coating on the platform 14 is then refurbished after the replacement section is installed. The replacement section 26 may be formed of a cast alloy, or alternatively, may be formed of a powder material, such as a selective laser melted (SLM) or selective laser sintered (SLS) material.

The size and shape of the removed section 24 may be determined after inspection of the blade 10 in order to ensure the removal of all cracks 18, 20 of concern. More than one section may be removed and replaced in a particular blade depending upon the pattern of flaws being repaired. For a particular component design, a pattern of service-induced flaws may develop over a fleet of machines, and one or more replacement section(s) 26 having standardized dimensions may be developed which encompass all or most of the service-induced flaws for that fleet. The standardized replacement sections 26 may be manufactured in advance of a maintenance outage for a machine, and the material removal step may be controlled responsive to the standardized dimensions to provide a removed section 24 corresponding to one of the available replacement sections 26. Alternatively, material removal may be determined and performed as required upon inspection of the blade 22 and a replacement section 26 made to mate with the as-removed section 24. Computer and vision systems known in the art may be used to dimension and/or to create the removed section 24 and to guide the manufacturing of a mating replacement section 26.

Figure 4:
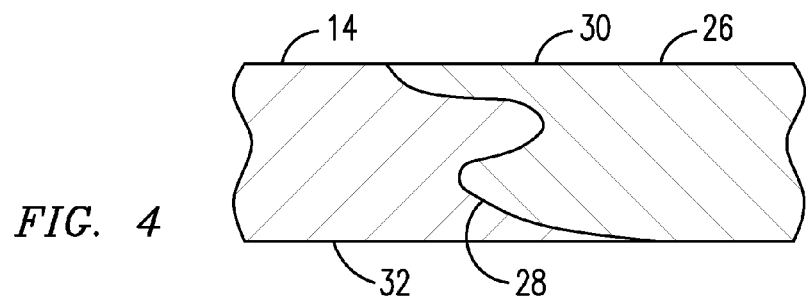
FIG. 4 is a partial side sectional view of the interface between the replacement section and the platform of FIG. 3.

FIG. 4 is a partial side sectional view of the braze joint interface 28 between the replacement section 26 and the platform 14 for one embodiment. The interface 28 has a mechanically interlocking shape (i.e. providing restriction of movement about at least two axes), which in this embodiment has a generally S-shape. Other shapes of interface may be envisioned, such as Z-shaped, C-shaped, W-shaped, U-shaped, etc. The mechanical interlock not only helps to reduce stress in the joint and to minimize crack propagation along the joint, but it also supports the replacement section 26 prior to bonding by allowing it to be slid into the location of the removed section 24 in a horizontal direction, in the manner of a drawer, while supporting the weight of the replacement section 26 in a vertical direction. Note that only a top surface 30 is exposed to the hot gas path and is usually covered by a thermal barrier coating, while the bottom surface 32 is typically actively cooled by compressed cooling air, therefore, the interface 28 is generally protected from the highest temperatures and stresses.

A process for repairing a gas turbine engine component may include the following steps:
- remove the engine from service;
- optionally removing the component from the engine;
- clean the component to an extent required for later steps, including removing surface coatings as appropriate;
- perform inspection to locate defects as necessary;
- remove a section of the component containing a defect;
- prepare a replacement section;
- clean interface surfaces on the component and replacement section as required;
- join the replacement section to the component in place of the removed section by brazing;
- replace surface coating as appropriate;
- return component to engine as necessary; and
- return engine to service.

In one embodiment, a gas turbine blade is formed of alloy 247 composition with a nominal weight percent composition of 8.3 Cr, 10 Co, 0.7 Mo, 10 W, 5.5 Al, 1 Ti, 3 Ta, 0.14 C, 0.015 B, 0.05 Zr and 1.5 Hf. The blade is removed from service and is found to have service-induced fatigue cracks in its platform. A platform section containing the cracks is removed by machining, and a replacement section of alloy 247 is joined in its place by brazing using a structural braze material, such as a braze powder, or a braze foil having a thickness of no more than about 0.003 inches. The braze material is formed of a near eutectic alloy having a narrow melting temperature range (such as less than 10° C.) and having a liquidus temperature of less than a solution temperature of the alloy 247 material (1,220° C.-1,260° C.). The assembly is solution heat treated for a time/temperature effective to homogenize the joint, such as between 1,225-1,260° C. for 2-12 hours. A structural braze alloy material containing no boron or silicon for this embodiment may have the following composition in weight percent:

| Nickel | 55-65 (example 60) |
| Titanium | 15-25 (example 20) |
| Chromium | 15-25 (example 20). |

An alternative braze alloy material containing no boron or silicon for this embodiment may have the following composition in weight percent:

| Chromium | 15-18 |
| Titanium | 10-15 |
| Aluminum | 0-2 |
| Cobalt | 2-4 |
| Tungsten | 3-5 |
| Manganese | 0-2 |
| Tantalum | 0-2 |
| Nickel | balance. |

Another alternative braze material may have the following composition in weight percent:

| Chromium | 12-16, |
| Titanium | 13-16, |
| Aluminum | 0-2, |
| Cobalt | 2-4, |
| Tungsten | 3-5, |
| Manganese | 0-2, |
| Tantalum | 0-2, and |
| Nickel | balance. |

Figure 5:
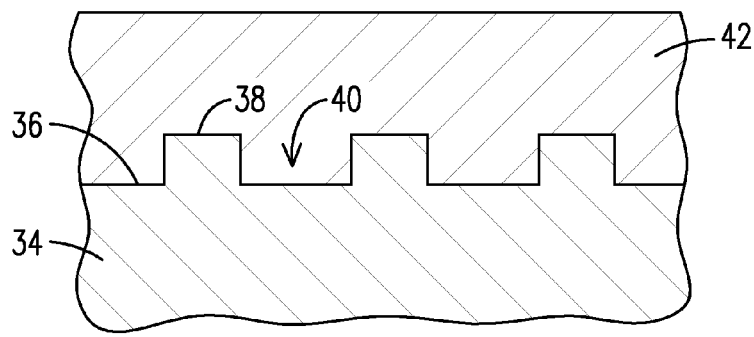
FIG. 5 is a partial sectional view of the surface of a replacement section illustrating a surface texturing.

FIG. 5 is a partial cross-sectional view of a replacement section 34 having a textured surface 36. The textured surface 36 is non-planar and contains any form of peaks 38 and valleys 40 desired in order to enhance the adhesion of an overlying thermal barrier coating system 42. The textured surface may be formed by etching, casting, laser ablation, water jet cutting, material addition, or any other known process. The textured surface 36 may be effective to improve the performance of the thermal barrier coating system 42 in comparison to a non-textured surface of the removed section that it replaces, and thus may be useful for reducing the incidence or rate of degradation of the repaired component in the region of the textured surface. Accordingly, a replacement section 26 may be installed reactively (to repair existing defects) or proactively (to prevent or slow the development of defects) in order to improve the performance of the component. Both used and new components may benefit from the disclosed process where only a particular section of the component is replaced in order to insert an improved material or improved surface in order to reduce the vulnerability of the component to service-induced degradation.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
   removing a section of a component comprising a superalloy material; and
   installing a replacement section comprising a superalloy material in place of the removed section using a braze material containing no boron or silicon comprising a composition by weight percent of:

| Nickel | 55-65, |
| Titanium | 15-25, and |
| Chromium | 15-25. |

2. The method of claim 1, further comprising:
   removing a non-textured surface section of the component containing a defect; and
   installing a textured surface replacement section in place of the removed non-textured surface section of the component.

3. The method of claim 1, further comprising installing a replacement section manufactured from a superalloy material that is a different composition than the superalloy material of the removed section of the component.

4. The method of claim 1, further comprising:
   preparing the replacement section to have standardized dimensions; and
   removing the section of the component in response to the standardized dimensions to prepare the component to receive the replacement section.

5. The method of claim 1, wherein the component is formed of alloy 247.

6. The method of claim 1, further comprising using a braze material of the following composition by weight percent:
Nickel 60,
Titanium 20, and
Chromium 20.

7. A method comprising:
removing a section of a component comprising a superalloy material; and
installing a replacement section using a braze material comprising the following composition by weight percent:

| | |
|---|---|
| Chromium | 12-16, |
| Titanium | 13-16, |
| Aluminum | 0-2, |
| Cobalt | 2-4, |
| Tungsten | 3-5, |
| Manganese | 0-2, |
| Tantalum | 0-2, and |
| Nickel | balance. |

8. The method of claim 1, further comprising:
removing a section of the component containing a defect; and
forming a braze interface between the replacement section and the platform section to have a mechanically interlocking shape.

9. A method comprising:
evaluating a component comprising a superalloy material to identify a region of the component subject to service-induced defects;
removing material from the region of the component;
preparing a replacement section to replace the removed material, the replacement section comprising at least one of the group of: a different superalloy material than the removed material; and a different geometry than the removed material; and
installing the replacement section into the component in place of the removed material using a braze material containing no boron or silicon comprising a composition by weight percent of:

| | |
|---|---|
| Nickel | 55-65, |
| Titanium | 15-25, and |
| Chromium | 15-25. |

10. The method of claim 9, further comprising removing the material and preparing the replacement section to form a braze interface geometry that provides a mechanical interlock about at least two axes.

11. The method of claim 9, further comprising:
forming the replacement section to have a textured surface comprising peaks and valleys; and
depositing a thermal barrier coating over the textured surface.

12. The method of claim 9, further comprising:
forming the replacement section in advance to have predetermined dimensions; and
removing the material in response to the predetermined dimensions to prepare the component to receive the preformed replacement section.

* * * * *